(12) United States Patent
Guillez et al.

(10) Patent No.: US 6,786,527 B2
(45) Date of Patent: Sep. 7, 2004

(54) RETRACTABLE ROOF FOR VEHICLE, COMPRISING THREE LONGITUDINAL ELEMENTS

(75) Inventors: Jean-Marc Guillez, Cirieres (FR); Gérard Queveau, Le Pin (FR)

(73) Assignee: France Design, Le Pin (FR)

(*) Notice: Subject to any disclaimer, the term of this patent is extended or adjusted under 35 U.S.C. 154(b) by 0 days.

(21) Appl. No.: 10/415,113

(22) PCT Filed: Oct. 12, 2001

(86) PCT No.: PCT/FR01/03172
§ 371 (c)(1), (2), (4) Date: Apr. 23, 2003

(87) PCT Pub. No.: WO02/34560
PCT Pub. Date: May 2, 2002

(65) Prior Publication Data
US 2004/0041436 A1 Mar. 4, 2004

(30) Foreign Application Priority Data
Oct. 23, 2000 (FR) .......................... 00 13549

(51) Int. Cl.[7] .................................. B60J 7/14
(52) U.S. Cl. ........................ 296/107.07; 296/107.08; 296/107.17
(58) Field of Search .............. 296/107.01, 107.07, 296/107.08, 107.17, 107.18, 107.2

(56) References Cited

U.S. PATENT DOCUMENTS

2003/0018116 A1 * 1/2003 Guillez et al. ......... 296/107.17

* cited by examiner

Primary Examiner—D. Glenn Dayoan
Assistant Examiner—Jason Morrow
(74) Attorney, Agent, or Firm—Nawrocki, Rooney & Sivertson, P.A.

(57) ABSTRACT

The invention concerns a roof retractable into the rear deck (5) of a vehicle. The retractable roof includes a front roof element (3) and a rear roof element (1) linked together by an intermediate element (2). Displacement of the elements (1, 2, 3) is controlled by a first mechanism for controlling and guiding the displacement of the rear element (1) towards a stowed position wherein the element (1) extends substantially horizontally to the upper part of the rear deck (5); the first mechanism co-operating with a second mechanism for controlling the lifting of the intermediate element (2) relative to the rear element (1), then for superposing the intermediate element (2) above the rear element in the rear deck (5); the second mechanism co-operating with a third mechanism for controlling the pivoting downwards of the front element (3) during its movement towards the rear deck (6) up to a position wherein the element extends substantially vertically to the front of the rear deck (5).

11 Claims, 3 Drawing Sheets

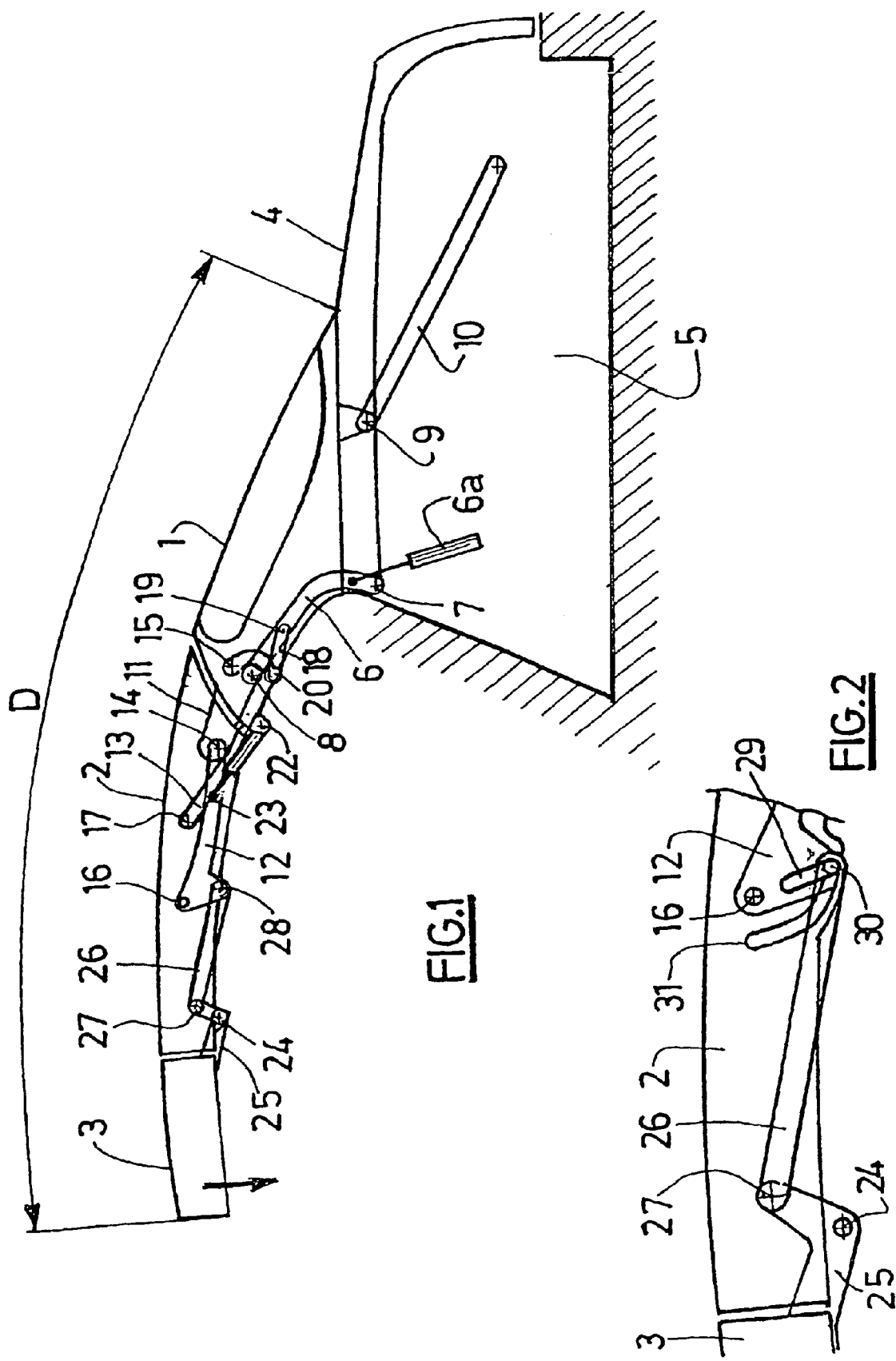

RETRACTABLE ROOF FOR VEHICLE, COMPRISING THREE LONGITUDINAL ELEMENTS

This is a United States national patent application filed under 35 U.S.C. §371 claiming priority under 35 U.S.C. §365(b) to French National Patent Application Serial No. 0013549 filed Oct. 23, 2000, now French Patent No. 2815582 published Feb. 7, 2003.

TECHNICAL FIELD

The present invention concerns a roof which is retractable into the rear boot of a vehicle. The invention relates more precisely to a roof which is retractable into the rear boot of a vehicle, comprising a front roof element and a rear roof element, connected together by an intermediate element, these elements being able to move between a closed position in which these elements extend above the cabin of the vehicle and a position in which the elements are stored in the rear boot, control means making it possible to move the roof elements between the above two positions. The above retractable roof makes it possible to convert a vehicle of the coupe type with a rigid roof into a vehicle of the cabriolet type whose cabin is completely open.

BACKGROUND OF THE INVENTION

In vehicles having a long roof length such as saloons or four-seater coupes, a problem is posed in storing these three elements inside the rear boot without excessively taking up the volume in the latter. The aim of the present invention is to propose a solution for resolving the above problem.

According to the invention, the retractable roof is characterised in that the said control means comprise:

first means for controlling and guiding the movement of the rear element to a stored position in which this element extends substantially horizontally at the upper part of the boot;

the said first means cooperating with second means for controlling the raising of the intermediate element with respect to the rear element and then the superimposing of this intermediate element above the rear element in the boot;

the said second means cooperating with third means for controlling the downward pivoting of the front element during its movement towards the boot, as far as a position in which this element extends substantially vertically at the front of the rear boot.

Because of these arrangements, there remains inside the boot, under the superimposed rear and intermediate elements, sufficient height above the floor of the boot, whilst the arrangement of the front element which is substantially vertical at the front of the boot makes it possible to obtain a sufficient boot length.

According to a preferred version of the invention, the said first means comprise a pivoting arm articulated on the chassis of the vehicle and at the front part of the rear element, the pivoting of this arm being controlled by a drive device and a fixed runner extending in the boot in which there is engaged a finger fixed to the rear part of the rear element. According to one advantageous version of the invention, the said second means comprise two levers articulated on the one hand on the front part of the rear element on axes situated in front of the axis of articulation of the said arm on the rear element and on the other hand on the intermediate element, the articulations of the said levers forming a deformable quadrilateral, one of the said levers being connected to the arm by a link connected to this lever and to this arm. According to a preferred embodiment of the invention, the said third means comprise a link connecting one of the said levers in an articulated fashion to an extension of the rear of the front element which is articulated on the front of the intermediate element. Other particularities and advantages of the invention will also emerge in the following description.

BRIEF DESCRIPTION OF THE DRAWINGS

In the accompanying drawings, given by way of non-limiting examples:

FIG. 1 is a schematic view in longitudinal section of a retractable roof according to the invention in the closed position;

FIG. 2 is a schematic view in partial longitudinal section of the front element and of the intermediate element of the roof, illustrating a detail concerning a preferred embodiment;

DETAILED DESCRIPTION OF THE INVENTION

Figure 3:
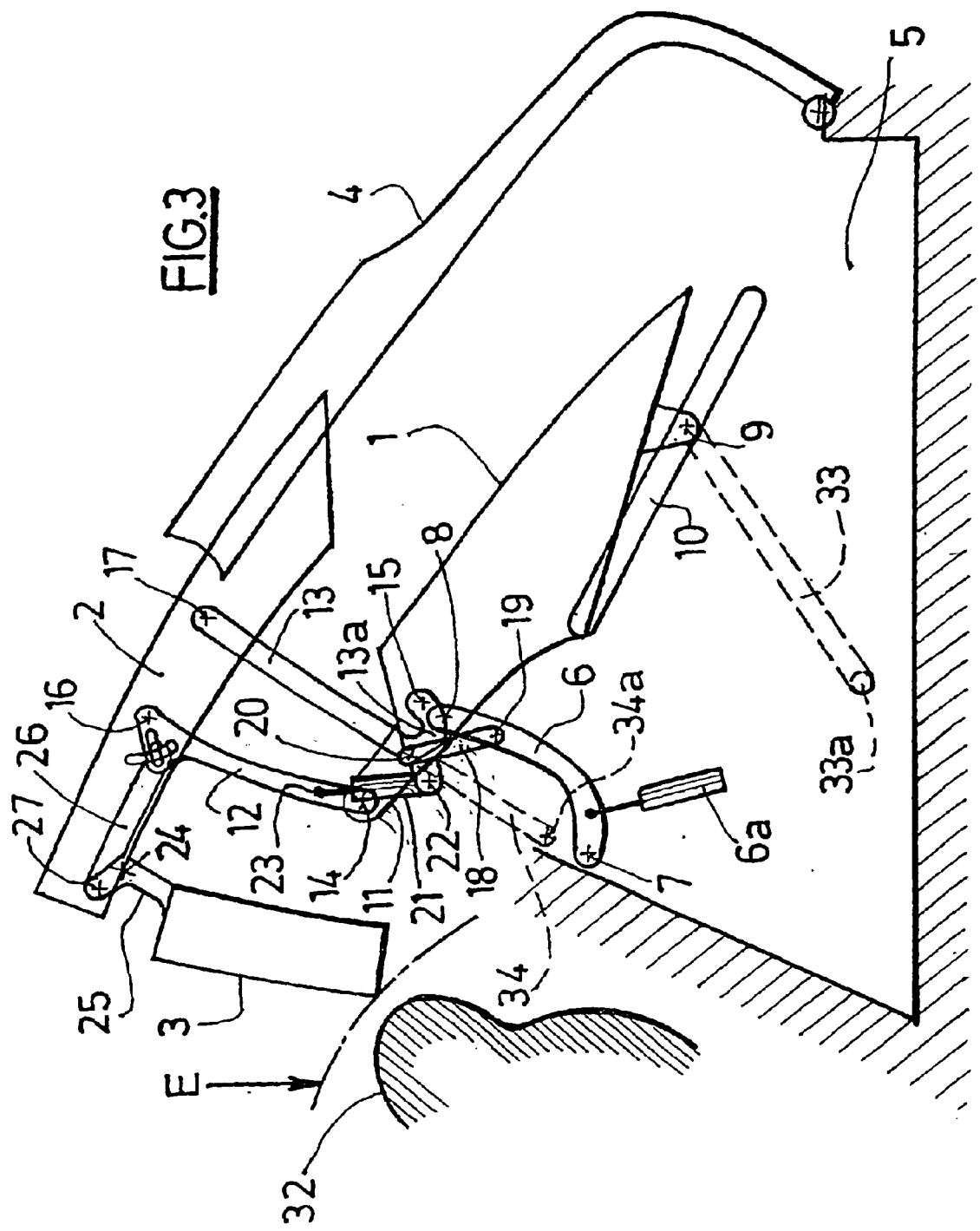
FIG. 3 is a similar view showing an intermediate position of the elements of the roof.

In the embodiment depicted in FIGS. 1 to 4, the roof which is retractable into the rear boot 5 of a vehicle comprises a rigid front roof element 3 and a rigid rear roof element 1, connected together by an intermediate rigid element 2. These elements are able to move between a closed position (FIG. 1) in which these elements 3, 2, 1 extend above the vehicle cabin and a position (FIG. 4) in which the elements 3, 2, 1 are stored in the rear boot 5. Control means make it possible to move the roof elements 3, 2, 1 between the above two positions.

Figure 4:
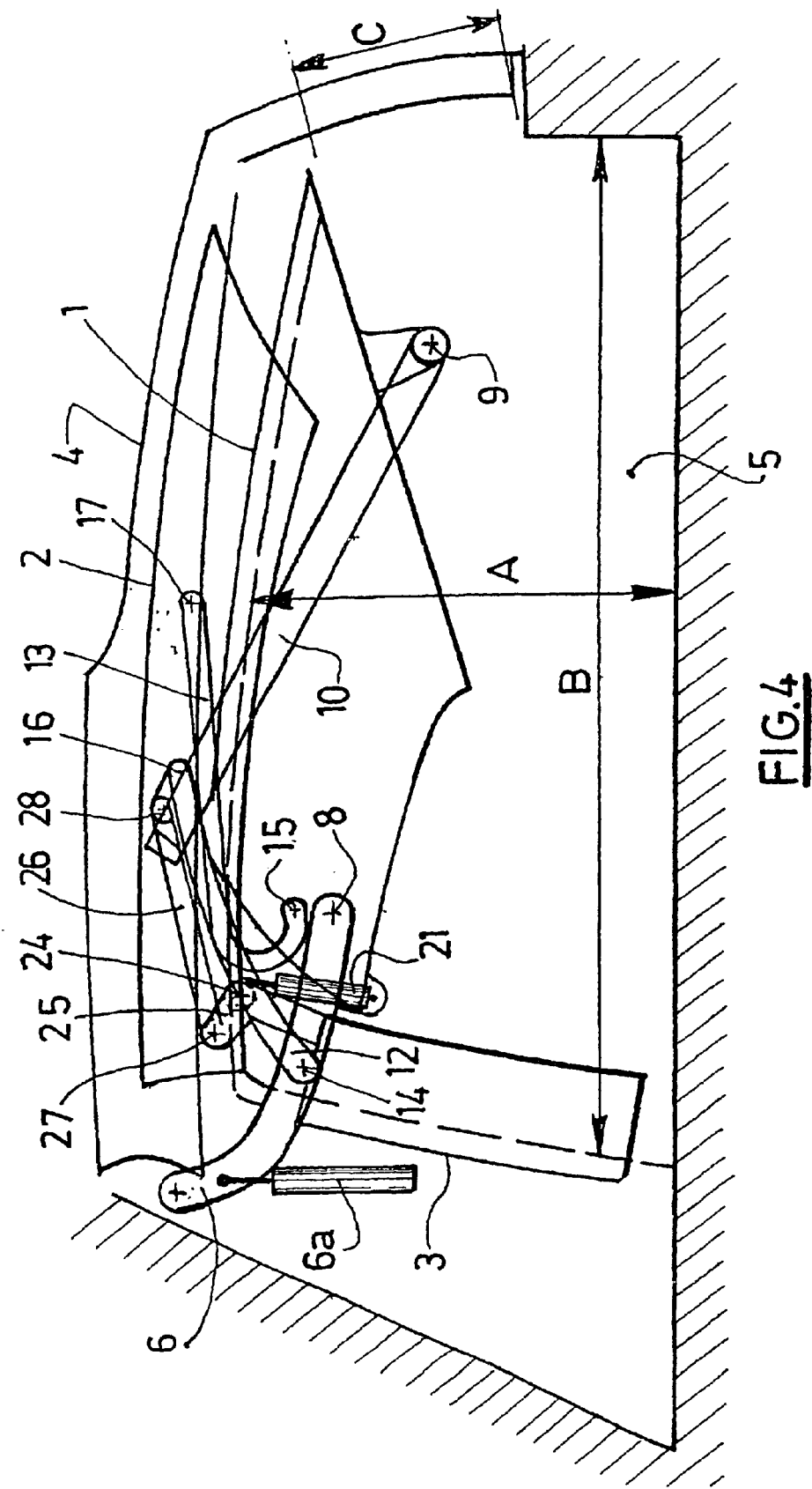
FIG. 4 is a view similar to FIGS. 1 and 3 showing the elements of the roof stored inside the rear boot of the vehicle.

In accordance with the invention, the control means comprise:

first means for controlling and guiding the movement of the rear element 1 to a stored position in which this element 1 extends substantially horizontally at the upper part of the boot 5 (see FIG. 4);

the said first means cooperating with second means for controlling the raising (see FIG. 3) of the intermediate element 2 and then the superimposing (see FIG. 4) of this intermediate element 2 above the rear element 1 in the boot 5;

the said second means cooperating with third means for controlling the downward pivoting (see FIG. 3) of the front element 3 during its movement towards the boot 5, as far as a position (see FIG. 4) in which this element extends substantially vertically at the front of the rear boot 5.

As indicated in FIGS. 1, 3 and 4, the first means comprise a pivoting arm 6 articulated at 7 on the chassis of the vehicle, close to the front top edge of the boot 5, and at 8 on the front part of the rear element 1. The pivoting of this arm 6 is controlled by a drive device 6a such as an actuator. In addition a fixed runner 10 extends in the boot 5. In the latter there is engaged a finger 9 fixed to the rear part of the rear element 1. According to a variant (see FIG. 3) the runner 8 is replaced by a second arm 33 articulated at 33a on the chassis and on the front part of the rear element 1, the second arm 33 forming a deformable quadrilateral with the arm 6.

As can also be seen in FIGS. 1, 3 and 4, the second means comprise two levers 12, 13 articulated on the one hand on the front part 11 of the rear element 1 on axes 14, 15 situated at the front of the axis of articulation 8 of the arm 6 on the rear element 1 and on the other hand on the intermediate element 2 on axes 16, 17. The articulations 14, 15, 16, 17 of the levers 12, 13 form a deformable quadrilateral. In addition one 13 of the levers is connected to the arm 6 by a link 18 articulated at 20 on this lever 13 and at 19 on this arm 6. As shown in particular in FIG. 3, the lever 13 has at its end adjacent to the arm 6 an elbow 13a. The link 18 is articulated at 20 close to the apex of this elbow 13a. According to a variant, the link 18 is replaced by a link 34 connected to this lever 13 and to an articulation axis 34a fixed with respect to the chassis (see FIG. 3).

FIGS. 1, 3 and 4 show moreover that the third means comprise a link 26 connecting, in an articulated fashion at 27, one 12 of the levers to an extension 25 of the rear of the front element 3. This extension 25 is articulated at 24 at the front of the intermediate element 2. In addition the link 26 is articulated on the said lever 12 on an axis 28 offset from the axis 16 of articulation of the lever 12 on the intermediate element 2. In addition this link 26 is articulated on the extension 25 of the front element 3 on an axis 27 situated beyond its axis 24 of articulation on the intermediate element 2. In the variant illustrated by FIG. 2, one 12 of the levers is connected in an articulated fashion to the link 26 by a finger 30 slidably engaged in an oblong opening 29 provided at the end of the lever 12 adjacent to the intermediate element 2. In addition the finger 30 is also engaged in a curved groove 31 integral with the intermediate element 2. As shown, in particular by FIG. 3, one 12 of the levers is connected in an articulated fashion at 23 to a balancing member 21 which is articulated at 22 on the rear element 1 in order to balance the assembly during its movement towards the boot 5. Moreover, as shown by FIG. 3, the length of the arm 6 and of the levers 12, 13 is sufficient so that, during the movement of the roof elements 1, 2, 3 towards the boot 5, the front element 3 being folded downwards, the latter can pass over the head 32 of a passenger situated at the rear of the vehicle cabin.

The functioning of the retractable roof according to the invention will now be described. In order to pass from the closed position to the open position, the movement of the roof takes place in the following fashion. First of all, the movement 1 drives the intermediate element 2 itself driving the front element 3. The rear element 1 is driven in its front part by the arm 6 articulated at 7 on the chassis and at 8 on the rear element 1. The rear part of the rear element 1 is driven by the shaft 9 fixed to this element 1 sliding in the runner 10 fixed to the chassis. The intermediate element 2 is driven by the two levers 12 and 13, forming a quadrilateral articulated on the one hand on the extension 11 of the element 1 respectively at 14 and 15 and on the other hand on the element 2 at 16 and 17. The arm 6 actuates the movement of the intermediate element 2 by pushing on the lever 13 by means of the link 18 articulated at 19 on the arm 6 and at 20 on the lever 13 when the said arm 6 rotates. This movement is balanced by a damper 21 articulated respectively at 22 on the element 1 and at 23 on the lever 12. The lever 12 actuates the movement of the roof element 3 by means of a link 26 pushing on the extension 25 of the element 3. The variant illustrated by FIG. 2 enables the element 3 to have a non-linear rotation movement to allow it a more sophisticated movement, such as the passage E over the head 32, illustrated by FIG. 3. In this case, the link 26 has a finger 30 sliding in an oblong opening 29 provided at the front end of the lever 12. When the lever 12 rotates about the axis 16, this lever 12 pushes the link 26 by means of the finger 30, itself pushing the extension 25 of the element 3 articulated at 24 actuating the element 3 rotationally. In order to control the movement of the link 26 by means of the finger 30 in a non-linear fashion, the said finger 30 slides in the groove 31 fixed to the element 2 fulfilling the role of a cam and whose shape depends on the angular movement required for the element 3. As shown by FIG. 4, the storage position of the elements 1, 2, 3 makes it possible to optimise the height A and length B of the boot 5 and the entry height C of the latter, and this in spite of the total length D of the large roof (see FIG. 1). The dimensions A, B, C are accentuated because the concavity of the elements 1, 2, 3 is directed towards the inside of the boot. Thus the invention is particularly well suited to saloons and four-seater coupés.

Naturally the invention is not limited to the example embodiments which have just been described and many modifications can be made to these without departing from the scope of the invention. Thus a centralised control can be provided, to control simultaneously:

the opening of the boot lid 4 from front to rear as indicated in FIG. 4 to allow passage of the roof elements;

the unlocking of the roof elements with respect to the bodywork;

the actuation of the actuator or of the motor in order to make the arm 6 pivot.

The lid 4 can also open from rear to front in order to facilitate the insertion and removal of luggage.

What is claimed is:

1. A roof which is retractable into a rear boot (5) of a vehicle, comprising a front roof element (3) and a rear roof element (1), connected together by an intermediate element, these elements (3, 2, 1) being able to move between a closed position in which these elements (3, 2, 1) extend above the cabin of the vehicle and a position in which the elements (3, 2, 1) are stored in the rear boot (5), control means making it possible to move the roof elements (3, 2, 1) between the above two positions, characterised in that the said control means comprise:

first means for controlling and guiding the movement of the rear element (1) to a stored position in which this element (1) extends substantially horizontally at the upper part of the boot (5);

the said first means cooperating with second means for controlling the raising of the intermediate element (2) with respect to the rear element (1) and then the superimposing of this intermediate element (2) above the rear element in the boot (5);

the said second means cooperating with third means for controlling the downward pivoting of the front element (3) during its movement towards the boot (5), as far as a position in which this element extends substantially vertically at the front of the rear boot (5).

2. A retractable roof according to claim 1, characterised in that the said first means comprise a pivoting arm (6) articulated on the chassis of the vehicle and at the front part of the rear element (1), the pivoting of this arm (6) being controlled by a drive device (6a) and a fixed runner (10) extending in the boot (5) in which there is engaged a finger (9) fixed to the rear part of the rear element (1).

3. (original) A retractable roof according to claim 1, characterised in that the said first means comprise a pivoting arm (6) articulated on the vehicle chassis and on the front part of the rear element (1), the pivoting of this arm (6) being controlled by a drive device (6a), and a second arm (33)

articulated on the chassis and on the front part of the rear element (1), this second arm (33) forming a deformable quadrilateral with the arm (6).

4. A retractable roof according to claim 1, characterised in that the said second means comprise two levers (12, 13) articulated on the one hand on the front part (11) of the rear element (1) on axes (14, 15) situated in front of an axis (8) of articulation of the said arm (6) on the rear element (1) and on the other hand on the intermediate element (2), the articulations (14, 15, 16, 17) of the said levers (12, 13) forming a deformable quadrilateral, one (13) of the said levers being connected to the arm (6) by a link (18) articulated on this lever (13) and on this arm (6).

5. A retractable roof according to claim 1, characterised in that the said second means comprise two levers (12, 13) articulated on the one hand on the front part (11) of the rear element (1) on axes (14, 15) situated in front of the an axis (8) of articulation of the said arm (6) on the rear element (1) and on the other hand on the intermediate element (2), the articulations (14, 15, 16, 17) of the said levers (12, 13) forming a deformable quadrilateral, one (13) of the said levers being connected to the arm (6) by a link (34) connected to this lever (13) and to an articulation axis (34a) fixed with respect to the chassis.

6. A retractable roof according to claim 4, characterised in that one of said two levers (12, 13) comprises, at its end adjacent to the arm (6), an elbow (13a), the said link (18) being articulated close to the apex of the said elbow (13a).

7. A retractable roof according to claim 4, characterised in that the said third means comprise a link (26) connecting, in an articulated fashion, one (12) of the said two levers to an extension (25) of the rear of the front element (3), which is articulated at the front of the intermediate element (2).

8. A retractable roof according to claim 7, characterised in that the said link (26) is articulated on said (12) one of the said two levers on an axis (28) offset from the axis (16) of articulation of said one of the said two levers (12) on the intermediate element (2), this link (26) being articulated on the said extension (25) of the front element (3) on an axis (27) situated beyond its axis (24) of articulation on the intermediate element (2).

9. A retractable roof according to claim 4, characterised in that one (12) of the said levers is connected in an articulated fashion to a balancing member (21) for balancing the assembly when it moves towards the boot (5).

10. A retractable roof according to claim 4, characterised in that one (12) of the levers is connected to the link (26) in an articulated fashion by a finger (30) slidably engaged in an oblong opening (29) provided at the end of the lever (12) adjacent to the intermediate element (2), the finger (30) also being engaged in a curved groove (31) integral with the intermediate element (2).

11. A retractable roof according to claim 4, characterised in that the length of the said arm (6) and of the said levers (12, 13) is sufficient so that, when the roof elements (1, 2, 3) move towards the boot (5), the front element (3) being folded downwards, the latter can pass over the head (32) of a passenger situated at the rear of the vehicle cabin.

* * * * *